United States Patent [19]
Ito

[11] Patent Number: 5,343,329
[45] Date of Patent: Aug. 30, 1994

[54] ZOOM LENS SYSTEM

[75] Inventor: Takayuki Ito, Tokyo, Japan

[73] Assignee: Asahi Kogaku Kogyo Kabushiki Kaisha, Tokyo, Japan

[21] Appl. No.: 958,783

[22] Filed: Oct. 9, 1992

[30] Foreign Application Priority Data

Oct. 11, 1991 [JP] Japan .................. 3-329415

[51] Int. Cl.$^5$ ............................. G02B 15/14
[52] U.S. Cl. .................. 359/689; 359/708; 359/713
[58] Field of Search ................ 359/689, 686

[56] References Cited

U.S. PATENT DOCUMENTS

| | | | |
|---|---|---|---|
| 4,773,744 | 9/1988 | Yamanashi . | |
| 4,822,152 | 4/1989 | Yamanashi . | |
| 4,854,682 | 8/1989 | Yamanashi . | |
| 4,909,613 | 3/1990 | Kikuchi | 359/689 |
| 4,955,700 | 9/1990 | Yamaguchi | 359/689 |
| 4,983,027 | 1/1991 | Kojima et al. . | |
| 5,173,806 | 12/1992 | Ogata | 359/686 |

FOREIGN PATENT DOCUMENTS 3930032  3/1990 Fed. Rep. of Germany .
63-159818  7/1988 Japan .

Primary Examiner—Edward K. Look
Assistant Examiner—Michael S. Lee
Attorney, Agent, or Firm—Sughrue, Mion, Zinn, Macpeak & Seas

[57] ABSTRACT

The improved zoom lens system comprises at least three lens groups which are arranged, in order from the object side, as a first lens group having a positive focal length, a second lens group having a positive focal length and a third lens group having a negative focal length, wherein, when zooming is carried out from the wide-angle to the narrow-angle end, said first, second and third lens groups are moved towards the object so that the distance between said first and second lens groups is increased whereas the distance between said second and third lens groups is decreased. The system is characterized in that each of the first and second lens groups has at least one aspheric surface.

3 Claims, 5 Drawing Sheets

ZOOM LENS SYSTEM

BACKGROUND OF THE INVENTION

This application is based upon Japanese Patent Application No. Hei. 3-329415 filed Oct. 11, 1992, a disclosure of which is incorporated herein by reference.

The present invention relates generally to a zoom lens system that is suitable for use with compact cameras which have a smaller constraint on back focus than single-lens reflex cameras. More specifically, the present invention relates to a zoom lens system that features a high zoom ratio of 2.5 and more.

Various types of zoom lens systems have heretofore been known for use with compact cameras. Zoom lenses consisting of three lens groups or more with a zoom ratio exceeding 2 are categorized as follows:

(i) Four-group zoom lens system comprising four lens groups (positive, negative, positive and negative groups), with a stop diaphragm being provided between the second and third groups, all lens groups being moved independently of each other towards the object (this type includes a system where some of the four lens groups are moved in unison). Examples of such zoom lens systems are disclosed in Japanese Patent Laid-Open Publications No. SHO 63-43115, No. SHO 63-159818 and No. SHO 63-157120.

(ii) Three-group zoom lens system comprising three lens groups (positive, positive and negative groups), with a stop diaphragm being provided in the second group, all lens groups being moved independently of each other towards the object. Examples of this zoom lens system are disclosed in Japanese Patent Laid-Open Publications No. SHO 63-153511 and No. SHO 63-161423.

(iii) Three-group zoom lens system comprising three lens groups (positive, positive and negative groups), with a stop diaphragm being provided between the second and third groups, all lens groups being moved towards the object (see, for example, commonly assigned Japanese Patent Application Unexamined Publication No. Hei. 2-73211).

(iv) Practically four-group zoom lens system that has the same composition as the system (iii) except that the second group is divided into a front and a rear group that are movable independently of each other (see Example 3 in the specification of commonly assigned Japanese Patent Application Unexamined Publication No. Hei. 2-73211, supra).

The above-described conventional zoom lens systems all have disadvantages. In the system (i), all of the four lens groups have to be moved independently of each other, so a large number of cams must be used; however, it is mechanically difficult to accommodate those cams in the small space available for lenses for use with a compact camera.

The systems (i) and (ii) also require that a shutter block also serving as a stop diaphragm be disposed either between the second and third lens groups (which are subject to substantial deterioration in performance due to manufacturing errors) or within the second group. Under the circumstance, high precision is required for the position of the shutter block while, at the same time, it is difficult to assure consistent optical performance since the imaging performance will be deteriorated greatly in the presence of slight errors.

Further, of the above systems (i) to (iv) have one problem in common; that is, the overall compactness of those systems is insufficient for using them with a compact camera and in each case, the overall system is composed of as many as 10 elements and more, with at least 5 elements being used in the second group.

The present invention has been accomplished under these circumstances of the prior art and has as an object providing a zoom lens system that features a high zoom ratio of 2.5 or more, that is short in the overall lens length, that is composed of a smaller number of lens element and which hence is suitable for use with a compact camera.

SUMMARY OF THE INVENTION

The above-stated object of the present invention can be attained by a zoom lens system that comprises at least three lens groups which are arranged, in order from the object side, as a first lens group having a positive focal length, a second group having a positive focal length and a third lens group having a negative focal length, wherein, when zooming is carried out from the wide-angle to the narrow-angle end, the first, second and third lens groups are moved towards the object so that the distance between the first and second lens groups is increased whereas the distance between the second and third lens groups is decreased, which system is characterized in that each of the first and second lens groups has at least one aspheric surface.

DESCRIPTION OF THE PREFERRED EMBODIMENTS

Examples of the present invention are described below.

Figure 1:
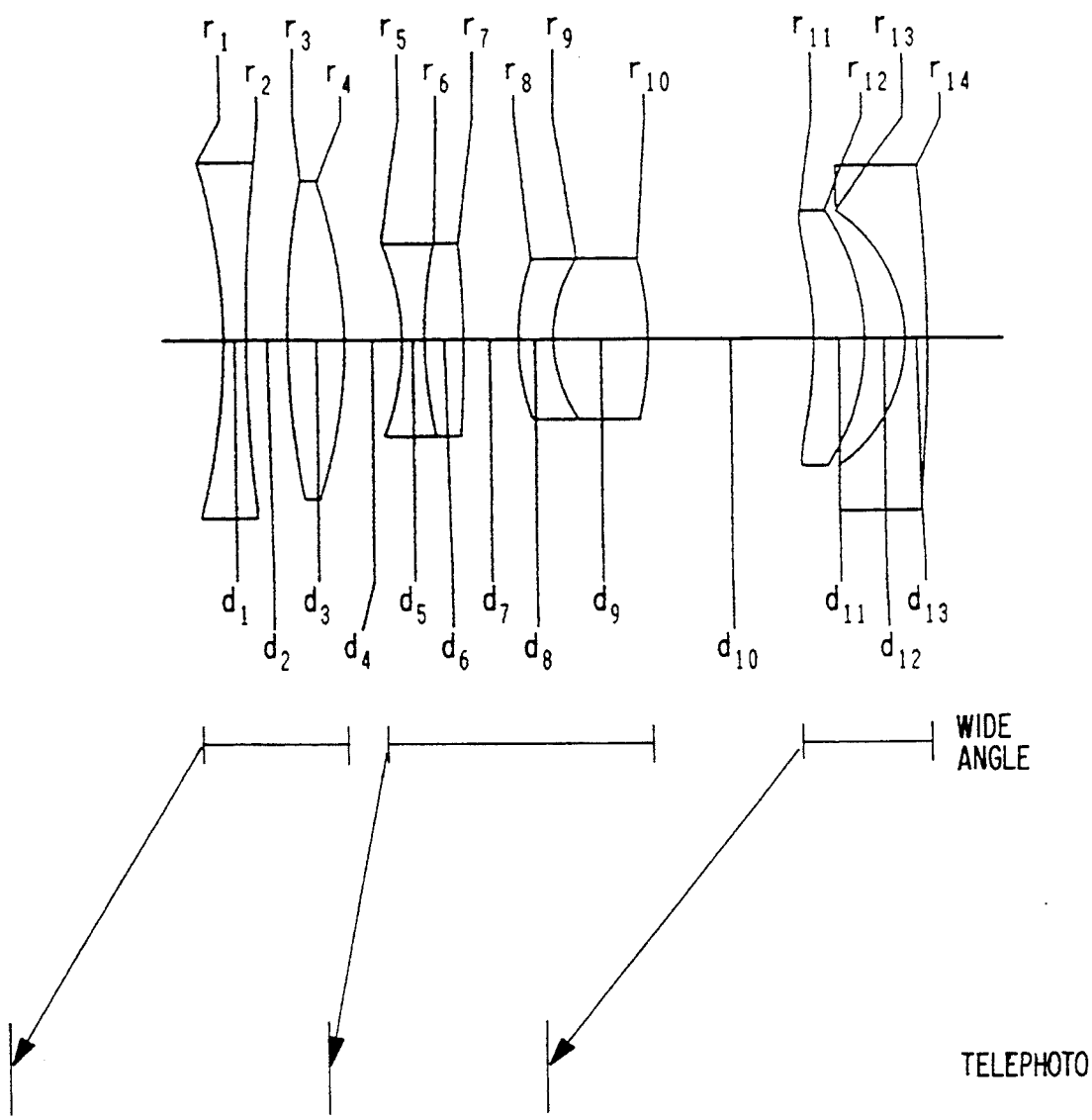
FIG. 1 is a simplified cross-sectional view of the zoom lens system according to Example 1 at the wide-angle end having arrows which indicate the amount of lens movement at the telephone end.

Each of the zoom lens systems according to the examples is one of a telephoto type that comprises, in order from the object side, a first lens group having a positive focal length, a second lens group of a great power having a positive focal length, and a third lens group having a negative focal length (see FIG. 1).

These zoom lens systems employ an aspheric surface in both the first and second lens groups and successfully reduce the number of constituent lens elements and the overall lens length.

Three-group zoom lens systems in general have a great positive power in the second lens group and this lens group is composed of many lens elements. Hence, one can reduce the number of constituent lens elements while making the overall size of the zoom lens system compact by providing an aspheric surface in the second lens group. The same results can be attained by providing an aspheric surface in the first lens group which, like the second lens group, has a positive power.

If, in implementing this approach of including aspheric surfaces, one incorporates a single aspheric surface in the second lens group alone, it is not very effective in reducing the number of constituent lens elements. A more effective way is to provide at least one aspheric surface in each of the first and second lens groups.

The second lens group has such a great positive power that it is difficult to attain balance between spherical aberration and other aberrations solely by means of spherical surfaces. It is therefore preferred that the spherical aberration that occurs in the second lens group is corrected by the divergent aspheric surface whereas all other aberrations are corrected by the aspheric surfaces, thereby attaining balance between all the aberrations that occur in the second lens group.

If the number of constituent lens elements is reduced, astigmatism is prone to be undercorrected and, hence, it is preferably corrected by aspheric surfaces.

The following is a supplemental discussion of the amount of variation in the coefficient of the third-order aberration due to an aspheric surface. The shape of an aspheric surface can generally be expressed by equation (1):

$$x = \frac{cy^2}{1 + \sqrt{1 - (1+K)c^2y^2}} + a4y^4 + a6y^6 + a8y^8 + a10y^{18} \ldots$$

where x is the distance by which the coordinates at the point on the aspheric surface where the height from the optical axis is y are departed from the plane tangent to the vertex of the aspheric surface; c is the curvature (1/r) of the vertex of the aspheric surface; K is the conic constant; and $a4$, $a6$, $a8$ and $a10$ are the aspheric coefficients of the fourth, sixth, eighth and tenth orders, respectively.

By calculating the focal length as f=1.0, namely, by substituting X=x/f, Y=y/f, C=fc, A4=$f^3a4$, A6=$f^5a6$, A8=$f^7a8$ and A10=$f^9a10$ into equation (1), the following equation (2) is obtained:

$$X = \frac{CY^2}{1 + \sqrt{1 - (1+K)C^2Y^2}} + A4Y^4 + A6Y^6 + A8Y^8 + A10Y^{18} \ldots$$

The second and subsequent terms of equation (2) define the amount of asphericity and the relationship between the coefficient A4 of the second term and the third-order aspheric coefficient $\phi$ is expressed by:

$$\phi = 8(N' - N)A4$$

where N is the refractive index of the medium before the aspheric surface and N' is the refractive index of the medium after the aspheric surface.

The aspheric coefficient $\phi$ provides the following amounts of variation in third-order aberration coefficients as one may call in the theory of aberrations:

$$\Delta I = h^4\phi$$

$$\Delta II = h^3 H \phi$$

$$\Delta III = h^2 H^2 \phi$$

$$\Delta IV = h^2 H^2 \phi$$

$$\Delta V = h H^3 \phi$$

where
- I: spherical aberration coefficient;
- II: coma coefficient;
- III: astigmatism coefficient;
- IV: sagittal field curvature coefficient;
- V: distortion coefficient;
- h: the height of paraxial on-axis rays at which they pass through each lens surface; and
- H: the height of paraxial off-axis rays passing through the center of the pupil, at which height they pass through each lens surface.

When aspheric surfaces are to be provided in the first and second lens groups, the use of only one aspheric surface is insufficient to achieve a substantial reduction in the number of constituent lens elements. Therefore, it is preferred to provide at least one aspheric surface that satisfies the following conditions (a) and (b) to each of the first and second lens groups:

(a) $-30 < \Delta I_2 < 0$ (b) $-1 < \Delta III_1 < 0$ where
- $\Delta I_2$: the sum of variations in the coefficient of the third-order spherical aberration due to all aspheric surfaces in the second lens group (the aberration coefficient is such as is calculated with the focal length of the overall system at the wide-angle end being taken as 1.0); and
- $\Delta III_1$: the sum of variations in the coefficient of astigmatism due to all aspheric surfaces in the first lens group.

Condition (a) relates to the aspheric surfaces in the second lens group and must be satisfied in order to correct spherical aberration effectively by the aspheric surfaces. If the upper limit of this condition is exceeded, the aspheric surfaces are no longer effective in correcting spherical aberration. If the lower limit of condition (a) is not reached, overcorrection of spherical aberration occurs.

Condition (b) relates to the aspheric surfaces in the first lens group and must be satisfied in order to correct astigmatism effectively by the aspheric surfaces. If the upper limit of this condition is exceeded, the aspheric surfaces are no longer effective in correcting astigmatism. If the lower limit of condition (b) is not reached, overcorrection of astigmatism occurs.

If at least two aspheric surfaces are provided in each of the first and the second lens groups in such a way as to satisfy conditions (a) and (b), the respective aspheric surfaces can be designed to perform different functions.

In another preferred embodiment, an aspheric surface can also be provided in the third lens group and by so doing, the conventional three-element composition which comprises, in order from the object side, a positive, a negative and a negative element can be simplified to a two-element composition that comprises a positive and a negative element in order from the object side.

In the examples, all lens systems are described as falling within the category of "three-group" type; it should, however, be noted that the second lens group may be considered to consist of two sub-groups and, in this respect, the applicability of the present invention will extend to the four-group zoom lens system that is described in the Prior Art section of this specification. Likewise, a three-group zoom lens system in which the last lens group is followed by a rear lens group having a smaller power is also included within the scope of the present invention.

The stop diaphragm may be positioned either within the second lens group or behind it. In the former case, the lens diameter of the front group can be reduced but, on the other hand, difficulty is involved in designing an effective lens composition. In the latter case (where the stop diaphragm is positioned between the second and third lens groups), the lens block can be separated from the shutter block, contributing to the realization of a simple mechanistic structure.

Examples 1 and 2 of the zoom lens system of the present invention are described below with reference to data sheets, in which f denotes the focal length, fB the back focus, r the radius of curvature of an individual lens surface (or the curvature radius of the vertex in the case of an aspheric surface), d the lens thickness or the air-space between lenses (the foregoing parameters are in millimeters), FNO. the F number, $\Omega$ the half view angle (in degrees), n the refractive index of an individual lens at the d-line, and $\nu$ the Abbe number of an individual lens at the d-line. In each data sheet, aspheric surfaces are distinguished from spherical surfaces by putting an asterisk after surface number, and A4, A6 and A8 denote the aspheric coefficients of the fourth, sixth and eighth orders, respectively.

EXAMPLE 1

Figure 2A:
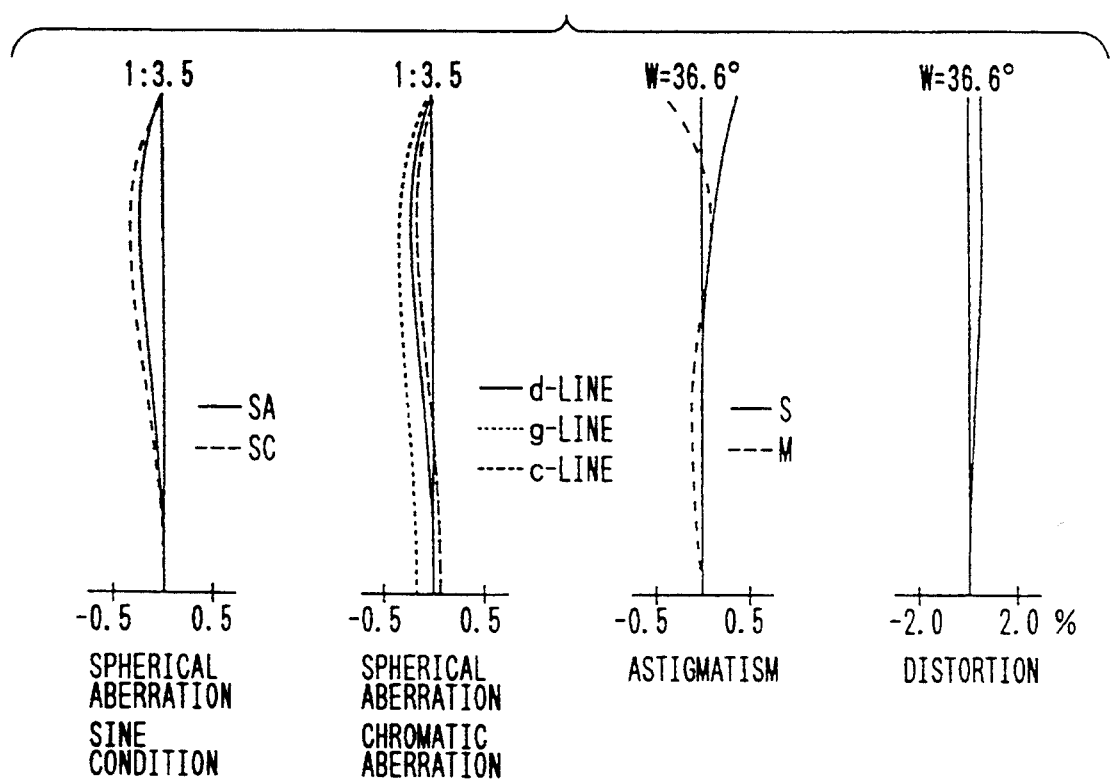
FIG. 2a–c are a set of graphs plotting the aberration curves obtained with the zoom lens system of Example 1.
Figure 2B:
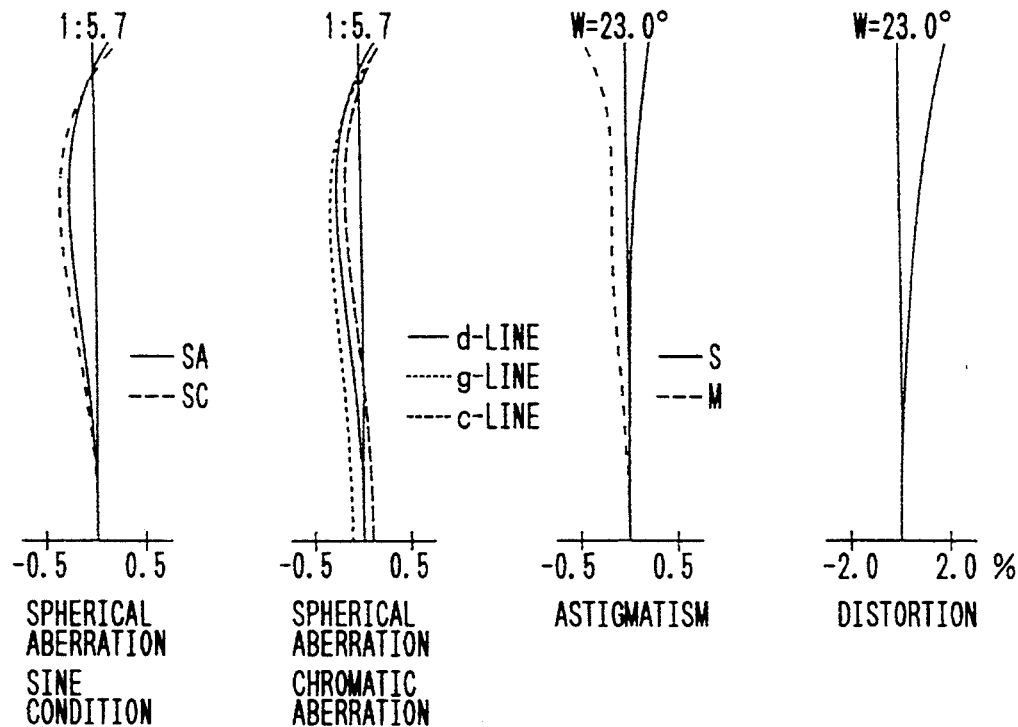
Figure 2C:
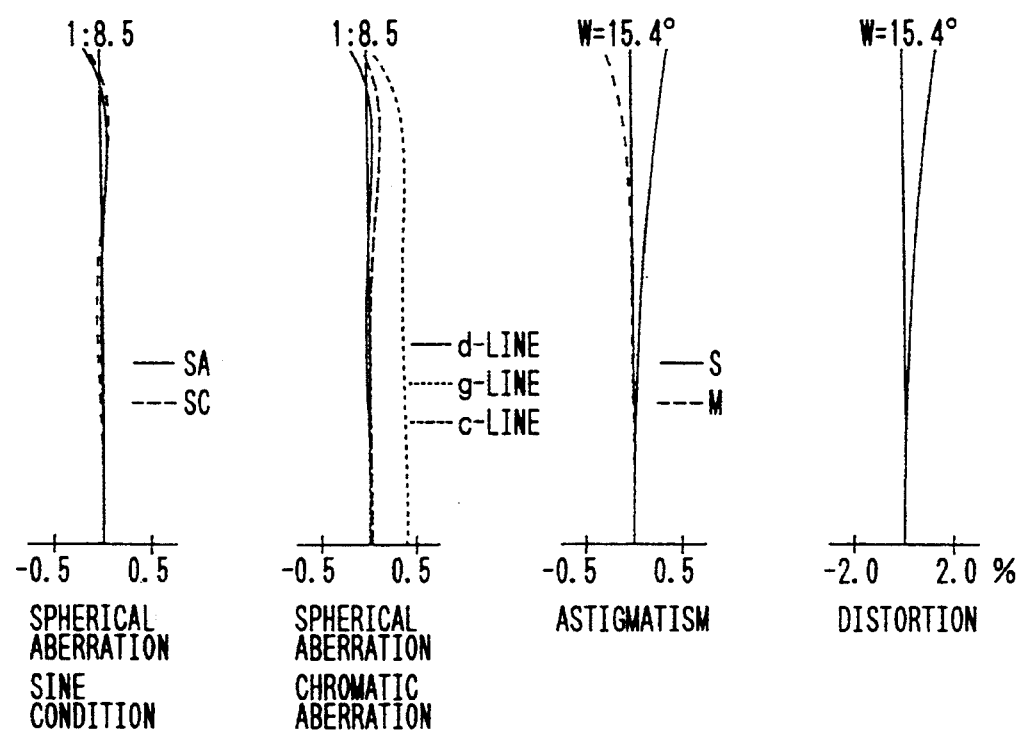

FIG. 1 is a simplified cross-sectional view of the zoom lens system according to Example 1 at the wide-angle end. Specific data for this example are as shown in Table 1. The aberration curves obtained with this lens system are plotted in FIGS. 2(a), 2(b) and 2(c).

TABLE 1

| Surface No. | r | d | n | $\nu$ |
|---|---|---|---|---|
| 1 | −42.988 | 1.50 | 1.83400 | 37.2 |
| 2 | 90.498 | 2.88 | | |
| 3 | 52.111 | 4.00 | 1.69680 | 55.5 |
| 4* | −29.362 | variable | | |
| 5 | −16.814 | 1.50 | 1.73077 | 40.5 |
| 6 | 27.555 | 2.67 | 1.80518 | 25.4 |
| 7 | −74.154 | 3.56 | | |
| 8 | 15.613 | 2.30 | 1.80518 | 25.4 |
| 9 | 9.481 | 6.44 | 1.58913 | 61.2 |
| 10* | −20.364 | variable | | |
| 11* | −25.577 | 3.40 | 1.68893 | 31.1 |
| 12 | −15.020 | 2.70 | | |
| 13 | −10.020 | 1.40 | 1.77250 | 49.6 |
| 14 | −125.860 | | | |

| Fourth aspheric surface | Tenth aspheric surface |
|---|---|
| K = 0 | K = 0 |
| $A_4 = 0.71014234 \times 10^{-5}$ | $A_4 = 0.55216448 \times 10^{-4}$ |
| $A_6 = 0.18285133 \times 10^{-8}$ | $A_6 = 0.36450519 \times 10^{-6}$ |
| $A_8 = -0.77801825 \times 10^{-11}$ | $A_8 = -0.92039024 \times 10^{-9}$ |

Eleventh aspheric surface
K = 0
$A_4 = 0.50222950 \times 10^{-4}$
$A_6 = 0.20250687 \times 10^{-6}$
$A_8 = 0.53626768 \times 10^{-8}$ The values of Fno., f, fB, $\Omega$, d4 and d10 vary with zooming as shown in Table 2.

TABLE 2

| FNo. | 3.6 | 6.0 | 8.5 |
|---|---|---|---|
| f | 29.00 | 50.00 | 77.39 |
| fB | 8.10 | 27.60 | 51.79 |
| $\omega$ | 36.6 | 23.0 | 15.4 |
| d4 | 3.90 | 7.27 | 10.48 |
| d10 | 11.44 | 5.53 | 2.47 |

EXAMPLE 2

Figure 3:
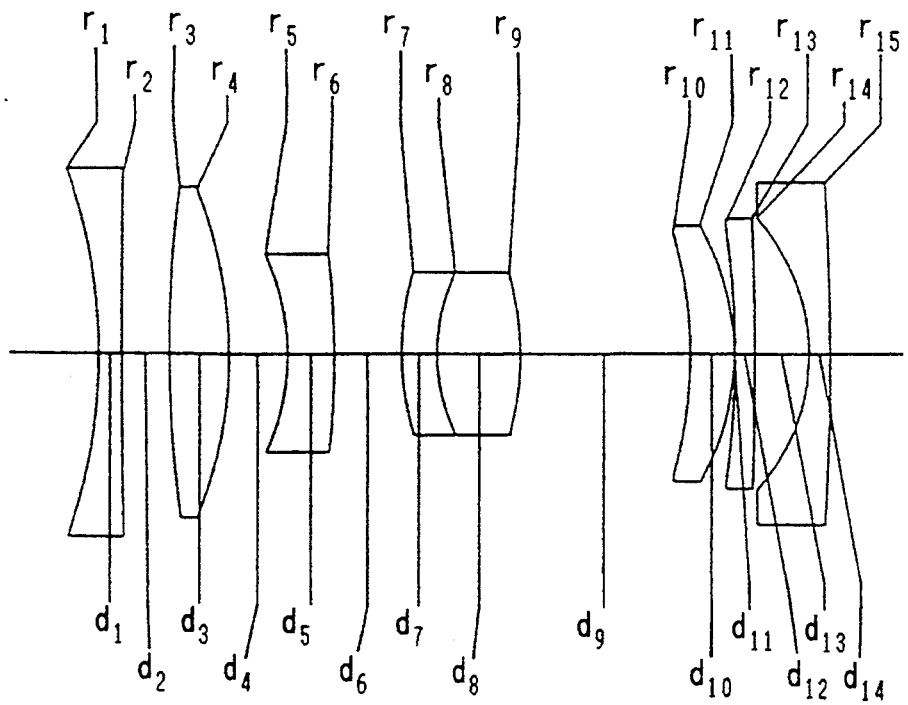
FIG. 3 is a simplified cross-sectional view of the zoom lens system according to Example 2 at the wide-angle end.
Figure 4A:
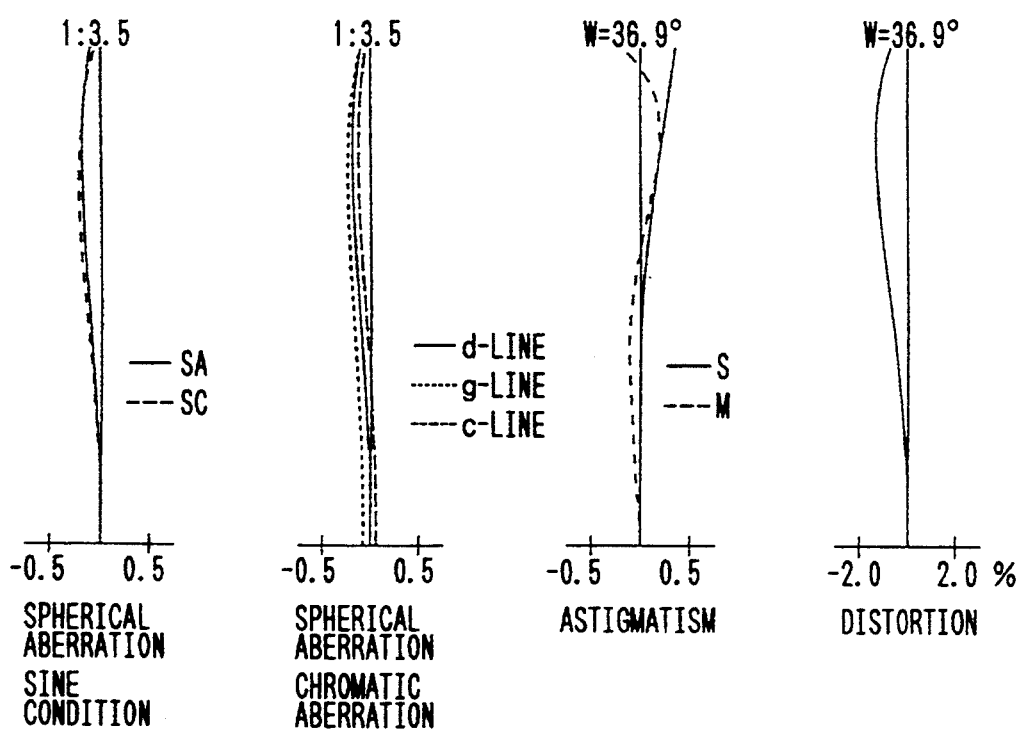
FIG. 4a–c are a set of graphs plotting the aberration curves obtained with the zoom lens system of Example 2.
Figure 4B:
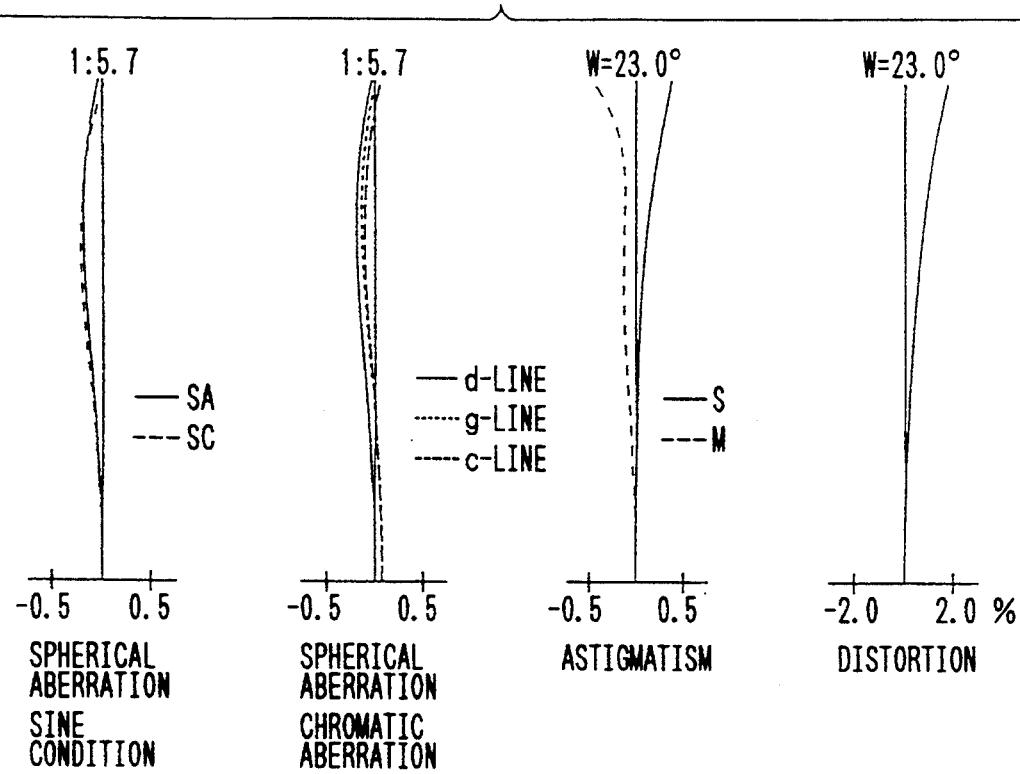
Figure 4C:
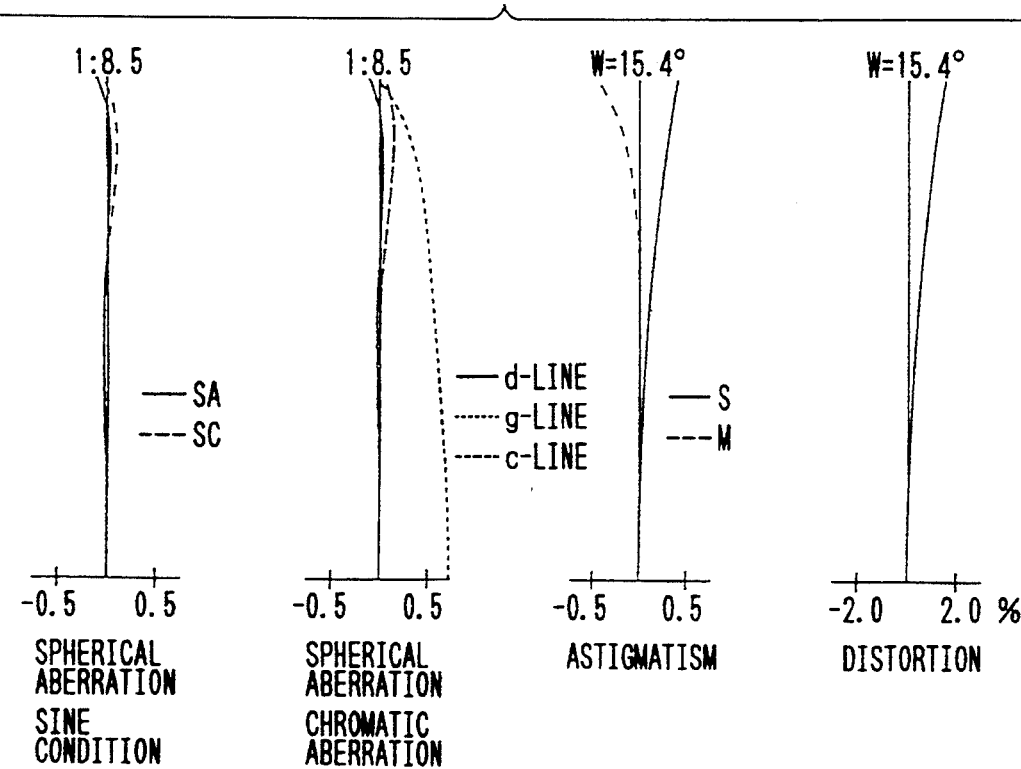

FIG. 3 is a simplified cross-sectional view of the zoom lens system according to Example 2 at the wide-angle end. Specific data for this example are as shown in Table 3. The aberration curves obtained with this lens system are plotted in FIGS. 4(a), 4(b) and 4(c).

TABLE 3

| Surface No. | r | d | n | $\nu$ |
|---|---|---|---|---|
| 1 | −35.339 | 1.50 | 1.83481 | 42.7 |
| 2 | 498.555 | 3.15 | | |
| 3 | 80.520 | 4.00 | 1.69680 | 55.5 |
| 4* | −26.542 | variable | | |
| 5 | −15.588 | 3.09 | 1.69680 | 55.5 |
| 6 | −59.742 | 4.36 | | |
| 7 | 18.388 | 2.30 | 1.80518 | 25.4 |
| 8 | 12.206 | 5.52 | 1.58913 | 61.2 |
| 9* | −18.034 | variable | | |
| 10 | −28.577 | 2.81 | 1.80518 | 25.4 |
| 11 | −17.178 | 0.10 | | |
| 12 | −60.034 | 1.30 | 1.77250 | 49.6 |
| 13 | −286.403 | 3.64 | | |
| 14 | −13.114 | 1.40 | 1.83481 | 42.7 |
| 15 | −207.293 | | | |

| Fourth aspheric surface | Ninth aspheric surface |
|---|---|
| K = 0 | K = 0 |
| $A_4 = 0.77515110 \times 10^{-5}$ | $A_4 = 0.65326338 \times 10^{-4}$ |
| $A_6 = 0.68111723 \times 10^{-8}$ | $A_6 = 0.26245822 \times 10^{-6}$ |
| $A_8 = -0.10034564 \times 10^{-10}$ | $A_8 = -0.20965611 \times 10^{-8}$ |

The values of Fno., f, fB, $\Omega$, d4 and d9 vary with zooming as shown in Table 4 below.

TABLE 4

| FNo. | 3.6 | 6.0 | 8.5 |
|---|---|---|---|
| f | 29.00 | 50.02 | 77.40 |
| fB | 8.10 | 27.36 | 51.11 |
| $\omega$ | 36.9 | 23.0 | 15.4 |
| d4 | 3.86 | 7.30 | 10.51 |
| d9 | 11.29 | 5.41 | 2.33 |

Table 5 shows values that satisfy the conditions (a) and (b) in Examples 1 and 2.

TABLE 5

| Condition | $\Delta I_2$ | $\Delta III_1$ |
|---|---|---|
| Ex. 1 | −9.1 | −0.28 |
| Ex. 2 | −13.3 | −0.28 |

As described on the foregoing pages, the zoom lens system of the present invention adopts an arrangement as simple as a three-group composition and, yet, by introducing special features in the arrangement of lens elements in the first and second lens groups and their shape, it achieves a high zoom ratio of 2.5 and more while featuring a wider view angle and reducing the lens diameter and the overall lens length. At the same time, it experiences less aberrational variations during zooming from the wide-angle to the narrow-angle end or from infinity to near distance. Further, it successfully reduces the number of lens elements used in the overall system. Consequently, the present invention offers a zoom lens system of a telephoto type that consists of a total of three groups and which is suitable for use with a compact camera.

What is claimed is:

1. In a zoom lens system comprising at least three lens groups which are arranged, in order from the object side, as a first lens group having a positive focal length, a second lens group having a positive focal length and a third lens group having a negative focal length, wherein, when zooming is carried out from the extreme wide-angle to the extreme narrow-angle end, said first, second and third lens groups are moved towards the object so that the distance between said first and second lens groups is increased whereas the distance between said second and third lens groups is decreased, each of said first and second lens groups has at least one aspheric surface.

2. A zoom lens system according to claim 1 wherein said aspheric surface satisfy the following conditions:

(a) $-30 < \Delta I_2 < 0$ (b) $-1 < \Delta III_1 < 0$ where $\Delta I_2$: the sum of variations in the coefficient of the third order spherical aberration due to all aspheric surfaces in the second lens group (the aberration coefficient is such as is calculated with the focal length of the overall system at the wide-angle end being taken as 1.0); and $\Delta III_1$: the sum of variations in the coefficient of astigmatism due to all aspheric surfaces in the first lens group.

3. A zoom lens system according to claim 1 wherein said third lens group comprises two lens elements which are arranged, in order from the object side, as a positive and a negative element and has at least one aspheric surface.

* * * * *